Jan. 11, 1949.                F. LINDERER                2,458,713
                            CROP COMPRESSOR
                         Filed Jan. 18, 1946
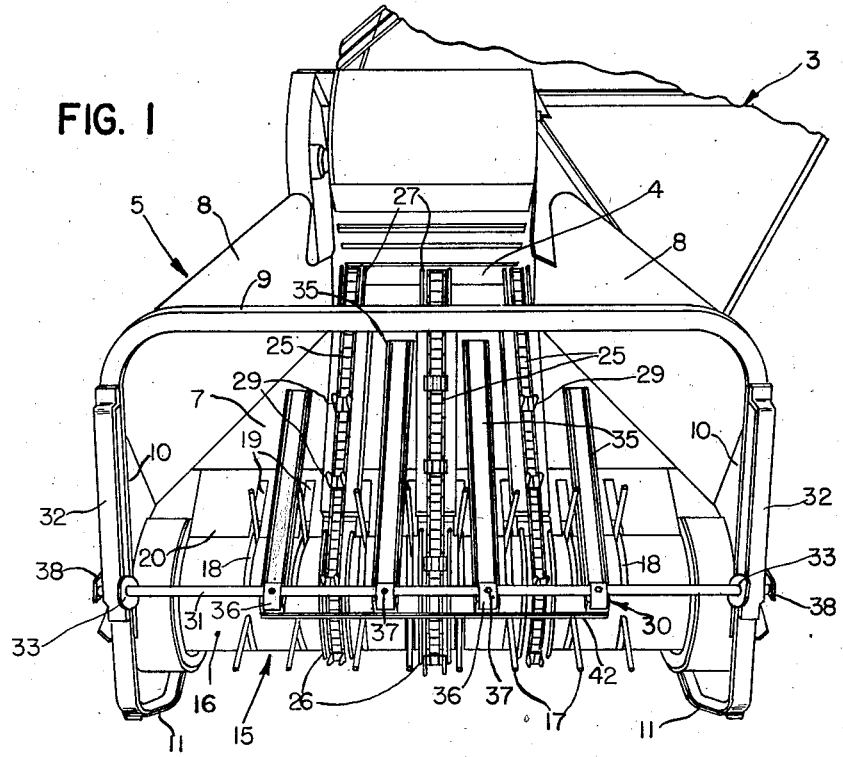
FIG. 1
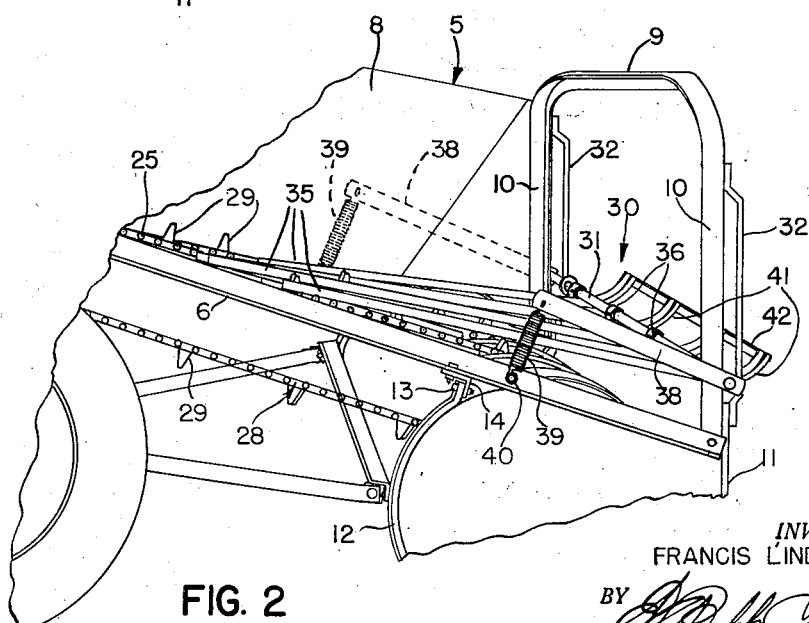
FIG. 2
INVENTOR.
FRANCIS LINDERER
BY
ATTORNEYS.

Patented Jan. 11, 1949

2,458,713

UNITED STATES PATENT OFFICE 2,458,713

CROP COMPRESSOR

Francis Linderer, Boise, Idaho, assignor, by mesne assignments, to Deere Manufacturing Co., a corporation of Iowa Application January 18, 1946, Serial No. 642,081

1 Claim. (Cl. 56—364)

The present invention relates generally to harvesters and more particularly to crop compressors for holding the harvested crop down on the harvester platform to assist the platform conveyor in conveying the crop rearwardly to the body of the harvester. The principal object of my invention relates to the provision of a novel and improved compressor which is simpler in construction, less expensive to manufacture, but strong, durable, and efficient in operation.

Certain types of harvester platforms, particularly those which incline upwardly and rearwardly from the crop gathering means at the forward end thereof and have upwardly and rearwardly extending crop conveyors, requires some provision for holding the crop down against the conveyor as the latter moves rearwardly along the inclined platform. This is particularly true with light fluffy crops, such as dry hay, to prevent the hay from blowing off the platform. Although a substantial pressure is desirable on the crops near the rear end of the platform to compress the crops for feeding them into the chopper or other crop treating mechanism, it is necessary that the pressure at the forward end of the compressor be light enough to permit the crops to readily flow over the forward edge of the platform and therefore it is essential that the passage of the crops is not impeded at this point. Therefore, it is a further object of my invention to provide a crop compressor in which the pressure against the crop increases toward the upper rear end of the platform, while the forward end of the compressor is free to float over the incoming crops without enough pressure to increase their progress.

These and other objects and advantages of my invention will be apparent to those skilled in the art after a consideration of the following description, in which reference is had to the drawing appended hereto, in which Figure 1 is a perspective front view of a harvester platform on a field hay chopper; and Figure 2 is a perspective side view of a portion of the platform, with the near side wall removed to show more clearly the details of construction of the crop compressor embodying the principles of my invention.

Referring now to the drawing, the implement is indicated in its entirety by reference numeral 3 and is a field hay chopper, the details of which are not an essential part of the present invention, except that it has an entrance throat 4, for receiving harvested crops from a forwardly extending harvester platform 5.

The platform 5 is part of a crop-handling means, another part of which includes a windrow pickup device to be described below. The platform itself comprises a structural frame 6, which provides part of a supporting structure on which is mounted a platform deck 7, which inclines downwardly and forwardly from the crop receiving opening 4 and has a pair of forwardly diverging vertically disposed side walls 8 extending from opposite sides of the opening on the throat 4 to the forward end of the platform. The structural frame 6 includes a structural arched member 9 extending transversely over the forward end of the platform 5 and curving downwardly at each end to form a pair of upright supports 10, which continue downwardly to a pair of ground engaging runners 11, the latter curving downwardly beneath the deck 7 and having rear ends 12 which turn upwardly and are connected by suitable bolts 13 to a transverse frame member 14 beneath the deck 7.

A windrow pickup device 15 is mounted transversely across the forward end of the platform 5 and comprises a rotatable drum 16 having several rows of laterally spaced crop engageable fingers 17 extending outwardly through slots 18 in the drum. The fingers 17 pass downwardly through slots 19 in a stripper plate 20 for stripping crops from the pickup drum 16 and is a continuation of the deck 7.

The crop-handling means is provided with crop conveying means in the form of a plurality of laterally spaced flexible endless chains 25, which pass around sheaves 26 on the drum 16 and extend upwardly and rearwardly over the deck 7 into the throat opening 4, where they pass over sheaves 27 within the throat 4 and are returned beneath the deck 7, as indicated at 28 (Figure 2). Each of the chains 25 is provided with a series of longitudinally spaced crop engageable teeth or lugs 29, projecting outwardly and movable with the chains 25 upwardly and rearwardly over the pickup drum 16 to the throat 4 for carrying crops from the pickup device 15 into the implement body 3.

The structure thus far described is similar to that disclosed and claimed in Patent 2,347,907, granted May 2, 1944, to G. B. Hill, to which reference may be made for a more complete description and showing.

Coming now to that part of the harvesting mechanism with which my invention is more particularly concerned, I have devised a crop compressor, indicated generally by reference numeral 30, including a transversely disposed shaft 31 overlying the forward end of the platform 5 above the pickup device 15. The two ends of the shaft 31 are supported in vertical slots, each of which is defined by one of the upstanding legs 10 of the arched member 9 and a strap member 32 spaced from the forward side of the member 10 and secured at its upper and lower end to the latter. The shaft 31 lies normally at the bottom of the slots but is free to shift or float vertically therein, and is restrained from lateral movement by a pair of washers 33 fixed to the shaft 31 inside the strap members 32.

Several presser members 35 are rigidly mounted in laterally spaced relation on the shaft 31 and extend rearwardly therefrom alongside of the conveyor chains 25 and substantially parallel thereto. Each of the presser members 35 preferably comprises a structural channel member and is secured to the shaft 31 by means of a U-shaped support 36, which straddles the shaft 31 and is rigidly fixed to the inner side of the associated channel 35, the latter being disposed with its flanges uppermost. Each of the supports 36 is prevented from rotating relative to the shaft 31 by means of a bolt 37 which extends through aligned openings in the U-shaped support 36 and through a diametrically extending opening (not shown) in the shaft 31.

A pair of arms 38 are rigidly fixed to the outer ends of the shaft 31, outwardly of the upstanding legs 10 and the side walls 8 of the platform, respectively. Each of the arms 38 normally extends upwardly and rearwardly from the shaft 31 and has biasing means in the form of a spring 39 connected to its outer end, the spring extending downwardly and rearwardly substantially perpendicular thereto, and anchored to the frame 6 of the platform by means of a suitable bolt 40.

The forward end of each of the presser bars 35 is turned upwardly, as indicated at 41, to facilitate feeding crops thereunder, the forward ends being interconnected by a transverse brace 42.

Thus it will be evident that the shaft 31 is free to rise and fall in its supporting slots within the straps 32, and is free to rock therein about its major axis. During operation, the pickup drum 16 rotates to move the teeth upwardly and rearwardly over the drum thereby picking up the windrowed crops and depositing them upon the conveyor chains 25. The forward ends of the presser bars 35 are supported by the shaft 31 in vertically spaced relation to the pickup device 15 to permit the crops to be gathered by the latter and started rearwardly up the platform. The rear ends of the presser bars 35, however, rest upon the deck 7 between the chains 35 and alongside the latter and therefore serve to hold the hay or other crops in engagement with the fingers 29 on the chains. The bottoms of the presser bars 35 are smooth and permit the crops to be readily conveyed thereunder. The bars 35 are held in contact with the crops, not only by their weight, but also by the springs 39, which are stressed in tension when the accumulation of crops on the platform tends to raise the presser bars 35 away from the deck 7. When the windrow is thin, there is very little force necessary to compress the windrow so that it will pass into the throat 4, but when the machine is picking up a thick heavy windrow, the presser bars are raised upwardly against the tension in the springs 39, thereby resulting in increased pressure against the crops to force them into the restricted throat 4. With a thick heavy windrow, the forward ends of the bars 35 are raised, thereby shifting the shaft 31 upwardly in the slots. At the beginning of a heavy windrow, the forward ends of the bars are thus shifted upwardly while the rear ends rest upon the deck. It will be noted that the springs 39 are not stretched to any great extent until the rear ends of the presser bars are raised by the windrow passing thereunder. Raising the rear ends of the bars 35 causes the shaft 31 to be rocked, thereby swinging the arms 38 upwardly to stretch the springs 39. Thus, it will be noted that the compressor 30 does not obstruct the feeding of the windrow to the platform when beginning to pick up a windrow, but applies an increased pressure after the windrow is well started up the platform.

I claim:

In a harvester having crop-gathering means at its forward end including crop-conveying means rearwardly thereof and supporting means including a pair of laterally spaced upright supports respectively at opposite outer sides of the crop-gathering means: a crop-compressor comprising a shaft disposed transversely between the supports and having opposite end portions projecting respectively outside the supports, means mounting the shaft on the supports for rocking movement generally about its major axis and for limited vertical floating movement relative to the crop-gathering means, a presser member fixedly connected to the shaft and extending rearwardly therefrom to have a portion remote from the shaft positioned over the crop-conveying means, a pair of arms separate from the presser member and fixed to said opposite end portions of the shaft and extending generally rearwardly therefrom respectively at opposite sides of the supporting means and respectively outside the opposite sides of the crop-conveying means, each of said arms terminating substantially midway between the shaft and the remote portion of the presser member, and a pair of tension springs connected respectively to the terminal portions of said arms and to the supporting structure and tending to turn the shaft to press both the remote portion and the shaft-connected portion of the presser member downwardly against crops moving over the crop-conveying means.

FRANCIS LINDERER.

REFERENCES CITED

The following references are of record in the file of this patent:

UNITED STATES PATENTS

| Number | Name | Date |
|---|---|---|
| 1,252,503 | Shultz | Jan. 8, 1918 |
| 1,338,215 | Davis | Apr. 27, 1920 |
| 1,815,327 | Raney et al. | July 21, 1931 |
| 2,141,493 | Tallman | Dec. 27, 1937 |
| 2,347,907 | Hill | May 2, 1944 |
| 2,378,107 | Russell | June 12, 1945 |